United States Patent Office.

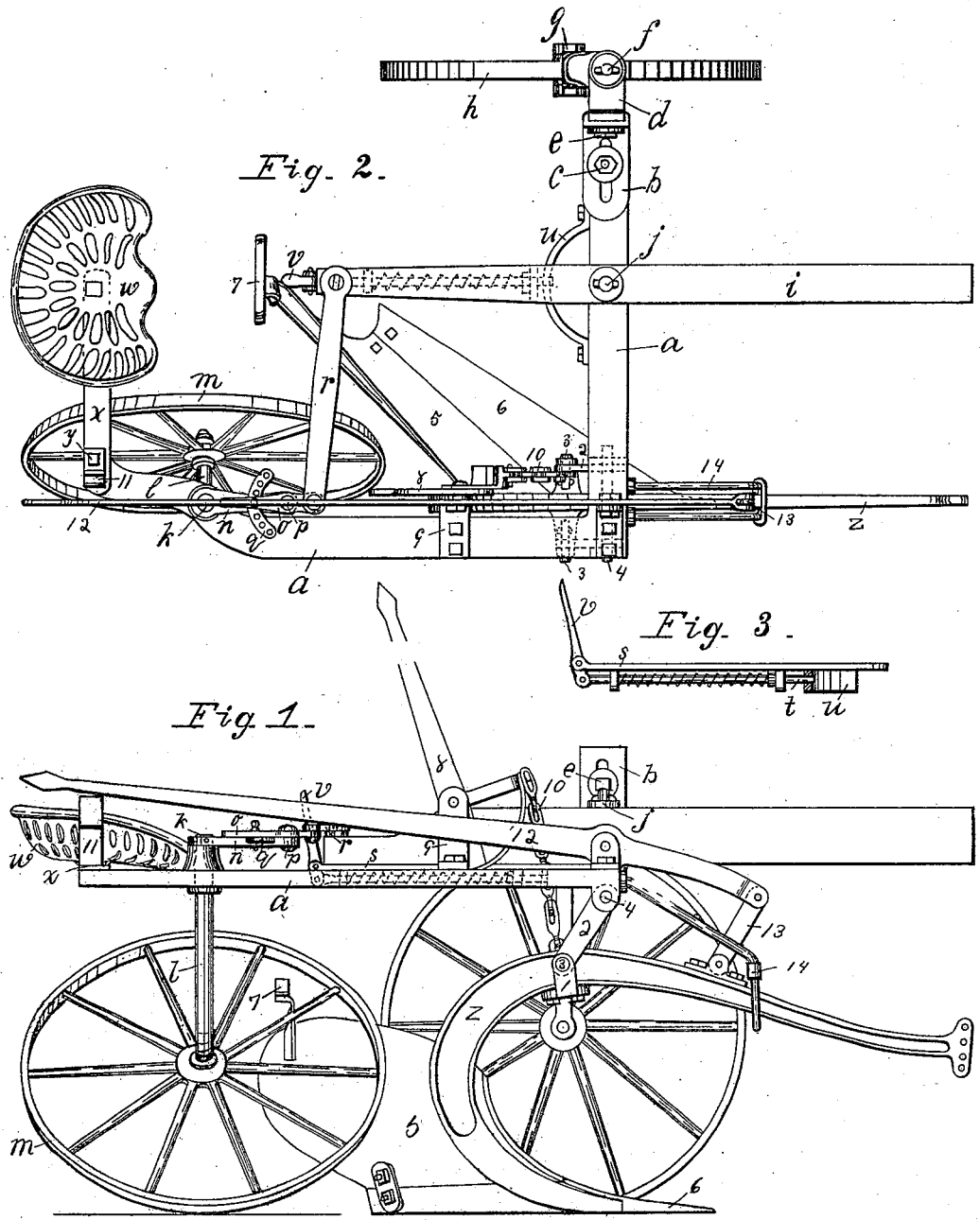

JACOB SICKLER, OF OTTERBEIN, AND EDWARD E. SICKLER, OF INDIANAPOLIS, INDIANA.

SULKY-PLOW.

SPECIFICATION forming part of Letters Patent No. 300,807, dated June 24, 1884.

Application filed October 5, 1883. (No model.)

*To all whom it may concern:*

Be it known that we, JACOB SICKLER, residing at Otterbein, in the county of Benton and State of Indiana, and EDWARD E. SICKLER, residing at Indianapolis, in the county of Marion and State of Indiana, both citizens of the United States, have invented a new and useful Improvement in Sulky-Plows, of which the following is a specification.

The objects of our invention are as follows: First, to provide a sulky which shall run smoothly in the furrows made by the plow, and obviate the digging and lifting of the plow (and the consequent heavy draft upon the team) caused by the sulky running over uneven ground; second, to so pivot the wheels of the sulky and guide them in turning that the team and plow may be turned at a corner of the field without taking the plow out of the ground and without cramping plow, sulky, or team.

The accompanying drawings illustrate our invention.

Figure 1 is a side elevation. Fig. 2 is a plan. Fig. 3 is a detail showing the means by which the tongue is held in a rigid position on the main frame.

$a$ is the main frame, lying horizontally, made of angle-iron bent at right angles, as shown. A slotted angle-piece, $b$, is adapted to be moved upon $a$ and fastened thereon by a bolt, $c$. Another angle-piece, $d$, slides vertically in $b$, and is held in place by bolt $e$. $d$ carries a bearing, $f$, for the fork $g$, which passes down on each side of wheel $h$ to the center, making a bearing for the same. The center of wheel $h$ is set back of bearing $f$, converting it into a caster-wheel, which is free to move in any direction. The tongue $i$ is pivoted upon the main frame at $j$, and the rear end extends backward from pivot $j$.

On the rear end of frame $a$ is bearing $k$, in which the upright standard $l$ is journaled. On this upright, and running in the corner of the furrow behind the plow, is mounted the second sulky-wheel, $m$. The wheel $m$ is inclined so that it runs slightly against the land and forms a landside for the plow. On top of upright $l$ is fastened a lever, $n$, having a shorter lever, $o$, pivoted upon it at $p$. A segment, $q$, is mounted upon lever $n$, having several holes, through which a pin in lever $o$ fits, whereby $o$ is held in place.

To the outer end of $o$ is pivoted a connecting-bar, $r$, connecting lever $o$ with the rear end of tongue $i$. A plate, $s$, is fastened to the under side of the rear end of the tongue, carrying bearings through which a bolt, $t$, slides and engages a hole in a segment, $u$, on frame $a$. Bolt $t$ is thrown forward by a spring, but may be withdrawn by a lever, $v$. The seat $w$ is attached to frame $a$ by a flat spring, $x$, and bolt $y$. The plow-beam $z$ is hung to the under side of frame $a$ by a plate, 1, bolted to the under side of the beam, a swing, 2, bolts 3 3, and bolt 4, passing through ears on the frame $a$. Beam $z$ is bent to the shape of the moldboard 5 and share 6, and has both bolted to it. A foot-rest, 7, is fastened to the rear end of mold 5. The plow is raised out of the ground by a lever, 8, pivoted on an upright, 9, on frame $a$. Lever 8 is connected with plate 1 by means of chain 10. A spring-catch holds lever 8 down and suspends the plow when on the road or moving about. A lever, 12, hinged to frame $a$, and having its shorter end connected with beam $z$ by a link, 13, serves to force the plow into the ground by lifting on the longer end. A brace, 14, supports the forward end of the beam in raising or lowering.

The operation is as follows: The sulky-wheels are to run in the furrow last made and the one being made. The width between the wheels is adjusted for different-sized plows by means of the adjustable angle-piece $b$. The plow is leveled by moving $d$ on $b$ vertically. The plow is thrown out of the ground by the operation of lever 8, and is forced into the ground by lifting on lever 12, which forces down on the beam above or in front of the plow-point. Land and depth are given to the plow by the hitching of the team similar to a walking-plow. When wheel $m$ has no land to run against, (as is the case in turning the last furrow,) "lead" may be given it by withdrawing the pin and turning lever $o$ on lever $n$. If a corner of the field is to be turned, bolt $t$ is withdrawn, leaving the tongue free to move on its pivot. The team is now turned at an angle of about sixty degrees with its former direction. This turns wheel m at right angles to its former direction. If the team is now allowed to pull on the plow, turning it in the ground, it will carry the frame with it, wheel m traveling in an arc of which the plow is the center. As soon as the team regains the furrow, the tongue is straightened, and spring-bolt t secures it.

We claim as our invention—

1. The combination, with frame a, of pivoted tongue i, spring-latch v t, rack u, connecting-bar r, caster-wheel m, crank-standard l n, and connecting devices whereby the tongue is allowed to turn and give positive motion to the turning of the rear wheel, substantially as shown and described.

2. The combination, with the plow-frame a, of the front caster-wheel, h, and the rear caster-wheel, m, upon the swiveled standard l, adapted to be free or locked, and to carry the plow-frame without other support, substantially as shown and described.

3. The combination of frame a, adjustable caster-wheel h, caster-wheel m, swiveled standard l n, carrying rack q, adjustable lever o, connecting-bar r, and tongue i, substantially as shown and described.

JACOB SICKLER.
EDWARD E. SICKLER.

Witnesses:
A. V. SICKLER,
Z. A. SCOTT.